June 19, 1956     D. M. DECKER     2,750,992
SPORTSMAN'S SEAT
Filed Jan. 12, 1954
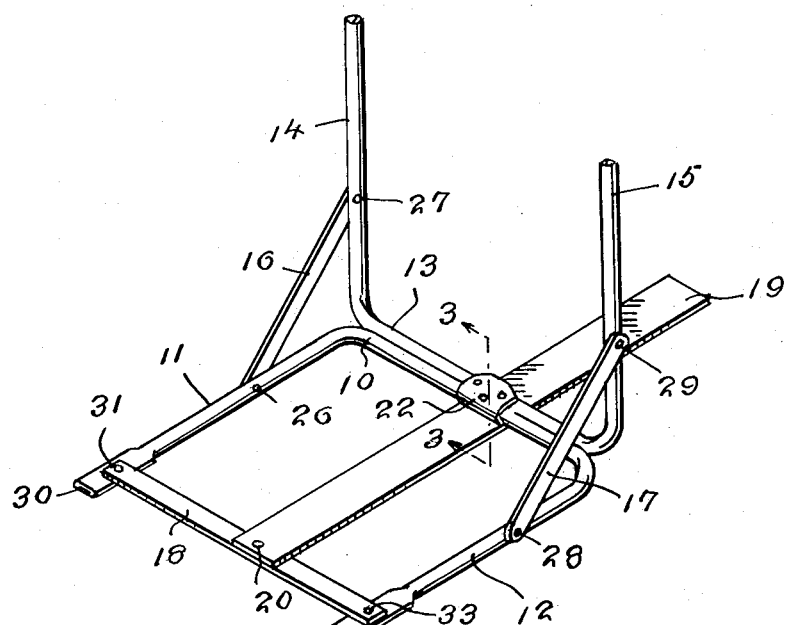
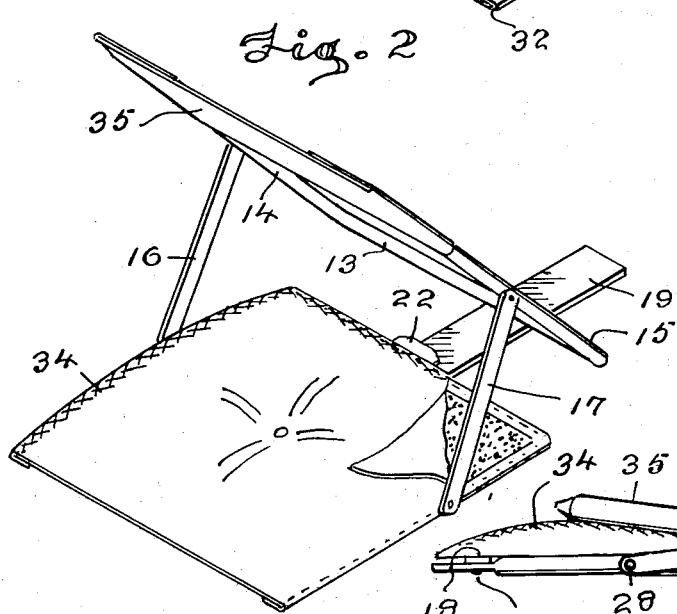
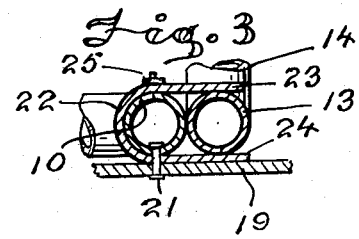
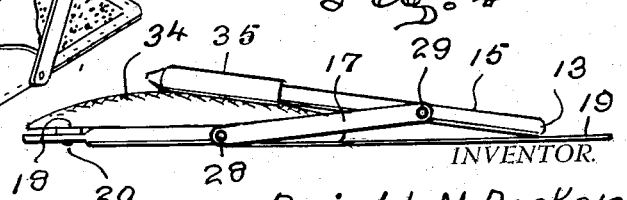
INVENTOR.
Dwight M. Decker
BY *Victor J. Evans & Co.*
ATTORNEYS United States Patent Office 2,750,992
Patented June 19, 1956

2,750,992

SPORTSMAN'S SEAT

Dwight M. Decker, Wilmington, Del.

Application January 12, 1954, Serial No. 403,476

3 Claims. (Cl. 155—153)

This invention relates to collapsible or folding seats of the type adapted for use on the beach, or for picnics, and that are also adapted for camping, hunting, and fishing, and in particular a seat including two U-shaped frames, one providing a frame for a seat the other a frame for a back, and a T-shaped support in which the stem, which is formed with a spring bar extends beyond the cross member, providing means for supporting the frame of the back in an upwardly extended position.

The purpose of this invention is to provide a folding or collapsible seat that is provided with a stablizing member for retaining the seat with the back in an upwardly extended position.

Various types of folding and collapsible seats have been provided particularly for use on beaches and the like, however, where a seat is formed with a seat frame with a back frame pivotally connected thereto it is difficult to support the seat with the back in an upwardly extended position and it is also difficult to fold the parts of the seat to a substantially flat position.

The object of this invention is, therefore, to provide means for stabilizing a folding seat in which the stabilizing means prevents the seat turning over backward.

Another object of the invention is to provide a folding seat formed with seat and back frames and a stabilizing spring bar in which the back of the seat is readily opened to a position for use.

A further object of the invention is to provide a folding seat having stabilizing means in combination therewith in which the seat is of a simple and economical construction.

With these and other objects and advantages in view the invention embodies a U-shaped seat frame having side rails with the rails connected at one end with a cross bar, a U-shaped back frame also having side rails connected with a cross bar, diagonally disposed braces connecting the frames at the sides, a T-shaped support including a cross bar extended across the open end of the seat frame and a spring bar secured to the cross bar and also secured to the cross member of the seat frame and suitable material for forming a seat on the seat frame and a band connecting upper ends of the side rails of the back frame.

Other features and advantages of the invention will appear from the following description taken in connection with the drawing, wherein:

Figure 1 is a view illustrating the improved seat structure showing the back frame extended upwardly and showing the parts with the seat cushion and band connecting the upper ends of the side rails of the back frame omitted.

Figure 2 is a perspective view illustrating the complete collapsible seat with the back in a partly open position and with part of the upper cover of the seat folded back to show the filling thereof.

Figure 3 is a cross section through the cross members of the seat and back frames taken on line 3—3 of Fig. 1, the parts being shown on an enlarged scale.

Figure 4 is a side elevational view of the seat showing the seat in the folded position.

Referring now to the drawing wherein like reference characters denote corresponding parts the improved folding seat of this invention includes a seat frame having a cross member 10 connecting the end of side rails 11 and 12, a back frame having a cross member 13 connecting the ends of vertically disposed rails 14 and 15, diagonally disposed braces 16 and 17 for supporting the back frame from the seat frame, and a T-shaped support comprising a cross bar 18 connecting the extended ends of the rails 11 and 12 and a spring bar 19 secured to the cross bar 18 at the point 20 and also secured by a rivet 21 to a U-shaped latching clip 22 that is positioned over the cross member 10 and that is provided with flanges 23 and 24 that are positioned to receive the cross member 13.

The clip or socket 22 is secured to the cross member 10 with a bolt 25 and, as illustrated in Fig. 3, the extended ends of the flanges 23 and 24 extend parallel to the spring bar or plate 19 whereby in setting up the back frame the cross member 13 engages the upper surface of the plate 19, causing the plate to flex downwardly whereby the cross member 13 is adapted to be forced into the open side or socket of the clip.

The lower end of the brace 16 is connected to the side rail 11 with a pin 26 and the upper end is similarly connected to the side rail 14 of the back frame with a pin 27. By the same means the brace 17 is pivotally connected with a pin 28 to the side rail 12 of the seat frame and the opposite end is pivotally connected with a pin 29 to the side rail 15 of the back frame.

As illustrated in Fig. 1 the cross bar 18 is secured to a flat section 30 of the rail 11 with a pin 31 and the rail 12 is provided with a similar flat section 32 to which an end of the cross bar 18 is secured by a pin 33.

With the parts set up, as shown in Fig. 1 and with a cushion 34 on the seat frame and a band 35 secured to the upper ends of the side rails 14 and 15 of the back frame a seat is provided that may readily be collapsed or folded to a substantially flat position to facilitate storing and shipping and that is also stabilized wherein resting against the back does not cause the seat to turn over.

In setting up the back of the seat the cross member 13 moves into engagement with the extended end of the spring bar 19 whereby the member 13 is snapped into the socket between the flanges 23 and 24 and with tension on the flanges properly adjusted the cross member 13 will be frictionally retained in the socket formed by the open end of the clip.

With the back of the seat resiliently held in this manner the spring bar 19 is adapted to bend sufficiently to allow considerable spring motion, to the back, adding comfort to the seat.

It will be understood that modifications, within the scope of the appended claims, may be made in the design and arrangement of the parts without departing from the spirit of the invention.

What is claimed is:

1. A collapsible seat comprising a U-shaped seat frame having side rails extended from the ends of a cross member, a U-shaped back frame having a cross member with side rails extended from ends thereof, diagonally disposed braces pivotally connected at one of the ends thereof to side rails of the seat frame and at their opposite ends to side rails of the back frame, a clip on the cross member of the seat frame and positioned to receive the cross member of the back frame, a cross bar connecting the extended ends of the side rails of the seat frame, a spring bar positioned on the under surface of the seat frame with one end connected to the cross bar and the other extended beyond the cross member connecting the side rails, said spring bar being connected to the cross member of the seat frame, a cushion positioned on said seat frame and a band connecting the upper ends of the side rails of the back frame.

2. A collapsible seat comprising a U-shaped seat frame having side rails extended from the ends of a cross member, a U-shaped back frame having a cross member with side rails extended from ends thereof, diagonally disposed braces pivotally connected at one of the ends thereof to side rails of the seat frame and at their opposite ends to side rails of the back frame, a clip U-shaped in cross section secured on the cross member of the seat frame and having arms extended to receive the cross member of the back frame, a cross bar connecting the extended ends of the side rails of the seat frame, a spring bar positioned on the under surface of the seat frame with one end connected to the cross bar and the other extended beyond the cross member connecting the side rails, said spring bar being connected to the cross member of the seat frame, a cushion positioned on said seat frame and a band connecting the upper ends of the side rails of the back frame.

3. In a folding seat, the combination which comprises a U-shaped seat frame having a cross member with side rails extended from the ends thereof, a cross bar connecting the extended ends of the side rails of the seat frame, a clip, U-shaped in cross section secured on the cross member of the seat frame with ends thereof extended from said cross member, a spring bar positioned with one end secured to the cross bar connecting the extended ends of the side rails of the seat frame, the opposite end of said spring bar extended beyond the cross member of the seat frame, means securing the spring bar to the clip mounted on the cross member of the seat frame, a back frame having a cross member with side rails extended from the ends thereof, and diagonally disposed braces positioned with ends thereof pivotally connected to side rails of the seat and back frames.

References Cited in the file of this patent

UNITED STATES PATENTS

| | | |
|---|---|---|
| 344,113 | Kafer | June 22, 1886 |
| 595,476 | Heller | Dec. 14, 1897 |
| 597,665 | Andren | Jan. 18, 1898 |
| 1,366,506 | Shattuck | Jan. 25, 1921 |
| 1,555,526 | Smith | Sept. 29, 1925 |
| 2,528,433 | Hines | Oct. 31, 1950 |
| 2,570,571 | Leeman | Oct. 9, 1951 |

FOREIGN PATENTS

| | | |
|---|---|---|
| 615,942 | Great Britain | Jan. 13, 1949 |
| 656,997 | Germany | Feb. 19, 1938 |
| 809,855 | France | Dec. 19, 1936 |
| 1,030,298 | France | Mar. 11, 1953 |